Nov. 30, 1965  M. MARTINEZ CELIS  3,220,162

GOODS DISPENSING DEVICE FOR SUPERMARKETS

Filed Jan. 12, 1962  3 Sheets-Sheet 1

INVENTOR
MARIO MARTINEZ CELIS
BY *Imirie and Smiley*
ATTORNEYS

Nov. 30, 1965   M. MARTINEZ CELIS   3,220,162
GOODS DISPENSING DEVICE FOR SUPERMARKETS
Filed Jan. 12, 1962   3 Sheets-Sheet 2
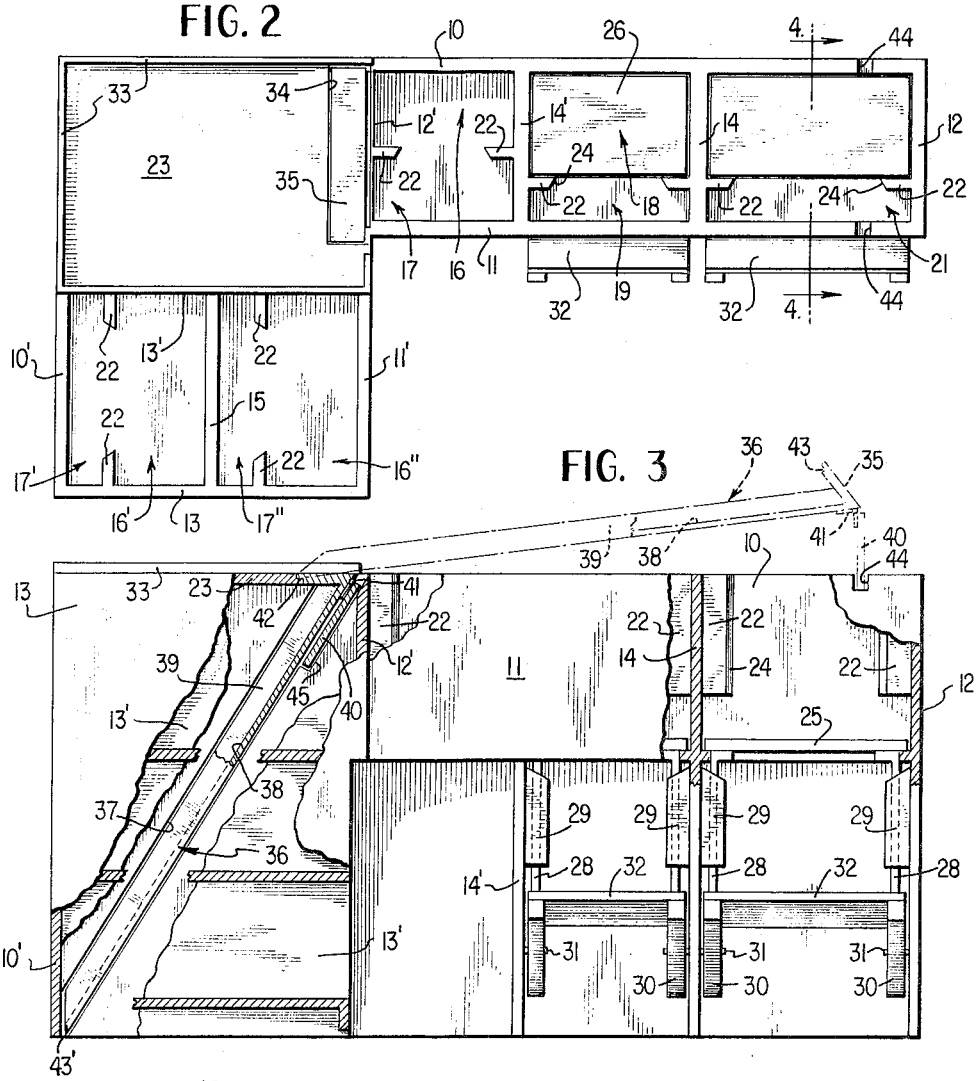
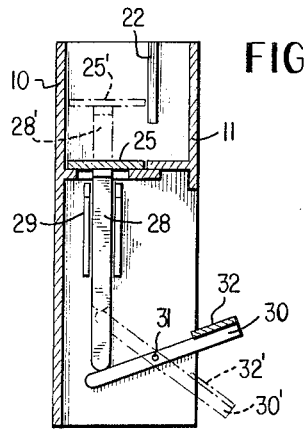
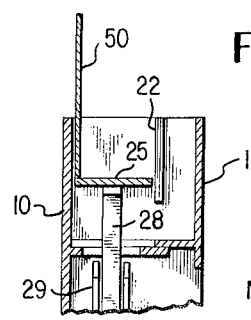
INVENTOR
MARIO MARTINEZ CELIS
BY
ATTORNEYS Nov. 30, 1965 M. MARTINEZ CELIS 3,220,162
GOODS DISPENSING DEVICE FOR SUPERMARKETS
Filed Jan. 12, 1962 3 Sheets-Sheet 3

INVENTOR
MARIO MARTINEZ CELIS

BY

ATTORNEYS.

3,220,162
GOODS DISPENSING DEVICE FOR
SUPERMARKETS
Mario Martinez Celis, Becquer 21, Mexico City, Mexico
Filed Jan. 12, 1962, Ser. No. 165,839
Claims priority, application Mexico, Aug. 26, 1961,
64,081
5 Claims. (Cl. 53—390)

The present invention relates to systems for accelerating the delivery of goods in a store of the type of a supermarket or the like and more particularly the present invention is related to a novel type of device having a plurality of compartments for open bags and for closed bags and a novel mechanism to enable the operater by the simple movement of a treadle to deliver a bag, already filled with goods, to a customer.

The present invention eliminates certain movements of the operator, hereinbefore considered necessary in the delivery and marking of the goods in a cash registering machine and counter of a supermarket or the like.

In this type of store, the businessmen have for a long time suffered from the slowness with which the cashier makes the account for each customer inasmuch as the cashier has to accomplish a complicated series of movements, such as discharging the goods from the cart of the customer, placing the goods on a table, taking the goods from such table in order to register or tally the prices thereof in a cash registering machine, packing the goods into paper bags or the like and delivering the filled bags to the customer together with the price to be paid.

This problem has already received attention from those skilled in the art in order to avoid such a great amount of movement of the cashier and some mechanized installations have been devised that by means of electric motors and conveyor belts and tables carry the goods to the hands of the cashier and expedite the operation. However, these installations are such that the customer himself is required to discharge the goods from the cart with the attendant troubles involved, and also most of the time, when the feed to the belts is too heavy, the belts stop and the whole system is also stopped delaying even more the delivery operation of the goods to the customer.

In other types of supermarkets the problem has been partially solved by the use of systems which are less expensive than the above described one and consisting of a tunnel under which the cart with the goods passes, so that said cart will be in close proximity to the cashier who withdraws the goods therefrom and places them upon a table to register the prices in a cash registering machine. However, here it is also necessary to discharge the goods to a table, marking the prices in the cash registering machine, and discharging the goods from the table to a suitable bag which will also have to be accommodated on the table already full of goods with the consequent troubles involved in this later operation.

Therefore, it is an object of the present invention to provide a novel delivering device which will avoid the direct discharge of the goods from the cart of the customer to a table in order to mark the prices in a cash registering machine.

Another object of the present invention is to provide a novel device of the above character, which has a plurality of divided compartments, into one of which sections a plurality of folded paper bags are contained, and another of which sections is adapted to receive an unfolded or open bag, which bags are unfolded or opened by a simple movement of the hand of the cashier or operator.

One more object of the present invention is to provide a device of the above character, which has compartments some of which are built so that they have a false bottom which is movable by means of a suitable linkage or piston rod in order to lift the bag when it is filled with goods and deliver it automatically to the customer.

Another object of the present invention is to provide a device of the above character, which has an angular form providing a table at the corner, and which has a chute or incline inserted into the surface of said table, such that said chute or incline can be withdrawn from the surface of the table and inserted into suitable grooves provided at the side walls of the false bottom compartment section in order to provide an incline to transport by gravity all the goods deposited on the upper end thereof, and convey them to said table.

Further objects of the present invention will become apparent from the detailed description hereinafter.

The above and other objects and advantages can be achieved by the device of the present invention, which will be hereinafter described in full detail, taking the description in connection with the accompanying drawings, wherein:

FIGURE 2 is a plan view of the device of FIGURE 1, showing the angular structure thereof, with the corner table, and two sections of compartments, with two of them having false bottoms to be lifted by the treadles, and also showing the chute in the rest position inserted into the surface of the table and forming a complementary portion thereof.

FIGURE 3 is a side elevational view of the device shown in FIGURES 1 and 2, illustrating the lifting mechanisms for the false bottoms and the chute inserted under the surface of the table, this figure also showing by means of dotted lines the position of the chute withdrawn from the table in order to form an incline above one of the sections of compartments.

FIGURE 4 is a cross sectional elevational view of the section of false bottom compartments, fully showing the false bottoms, treadles and lifting mechanisms to link them, and taken along the line 4—4 of FIGURE 2 and looking in the direction of the arrows.

FIGURE 5 is a side elevational cross-sectional view, partially broken, of the elevator mechanism showing the front vertical flap bonded to the false movable bottom of the compartment, in order to avoid accidental falling of the bag and to display an advertisement and the like.

Figure 7:
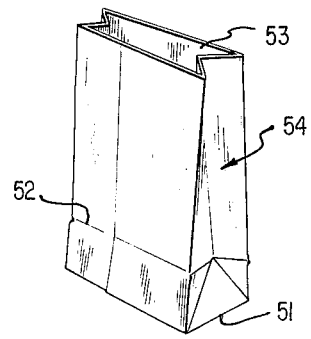
FIGURE 7 is a perspective view of the type of bag used in combination with the present dispensing device.

Referring now more particularly to the drawings, the device of the present invention is an angular rectangular unit comprising front or outer walls 10 and 10' which are located on the side which faces the customer, and back or innner walls 11, 11' which together form a housing for the cashier and the cash registering machine to be used in combination with the device. The unit has also end walls 12 and 13 and intermediate or dividing walls 14, 14′ and 15, and finally, a pair of walls 12′ and 13′ forming an angle of 90°, which walls complete the sections of compartments for storing and filling bags 54, FIG. 7, having flat folded bottoms 51.

The end and dividing walls 12, 12′, 13, 13′ and 14, 14′ are provided on their inner sides with perpendicular short ribs or partitions 22 in order to divide each compartment into a pair of compartments, one for accommodating folded paper bags, and another one for accommodating unfolded or open paper bags. The partitions 22 are short and extend from the upper edge of the compartment wall downwardly to a point spaced from the bottom of the compartment by a distance equivalent to the width of the bottom 51 of bags 54 to permit the passage thereof freely and without any obstruction under the lower ends of partitions 22. Inasmuch as the compartments illustrated to the left of the unit perform the same functions as those of the right side, only the latter will be described in full detail, but it will be understood that the compartments on the left are similar in all respects to compartments 16 and 17 of the righthand side of the unit.

Figure 1:
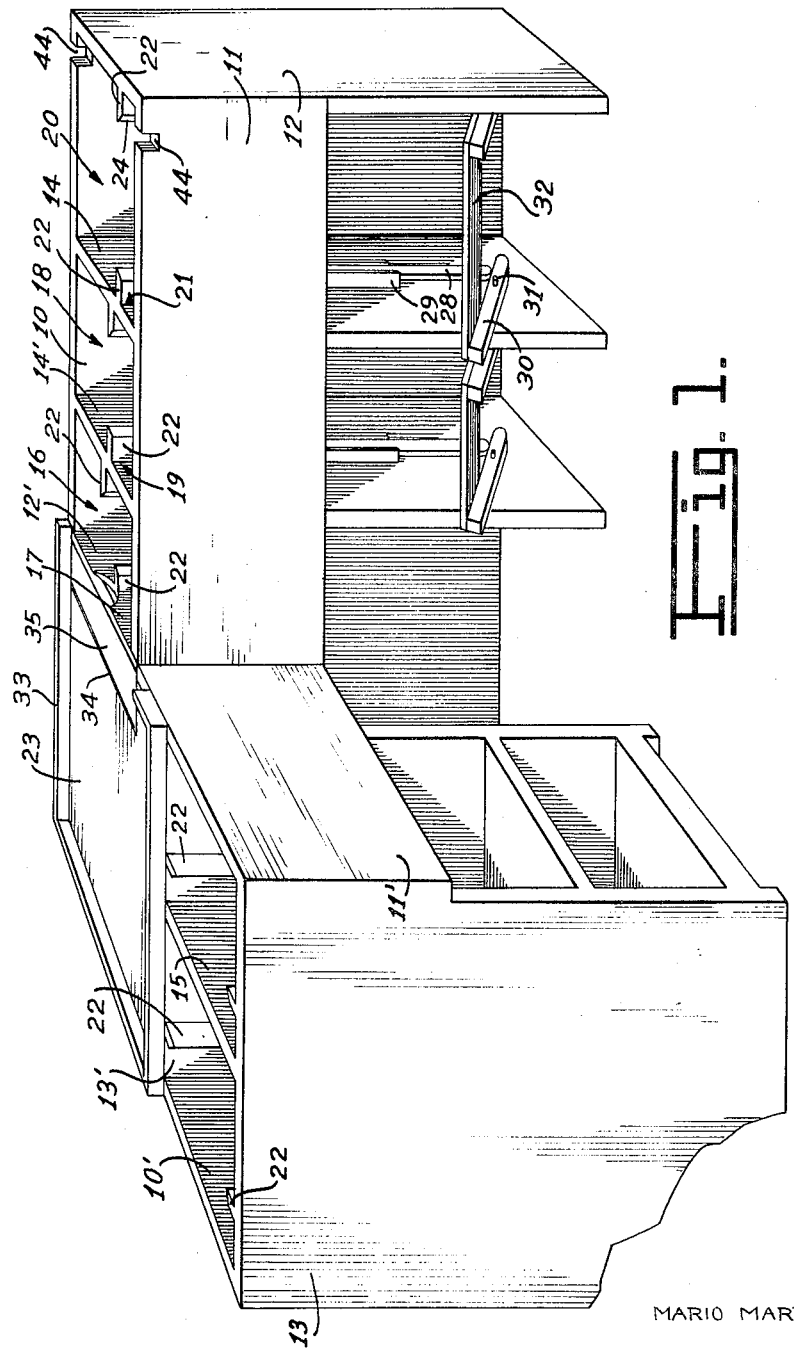
FIGURE 1 is a perspective view of the device of the present invention showing the compartments, the table and the treadles for the lifting mechanisms of the false bottoms of some of the compartments.

The compartments for accommodating folded bags are indicated in FIGURES 1 and 2 of the drawings by the reference numbers 17, 19 and 21 (and 17′ and 17″ also), while the compartments for unfolded bags are indicated in FIGURES 1 and 2 by the reference numbers 16, 18 and 20 (and 16′ and 16″ also). The bags in these latter compartments are ready for receiving goods to be later on delivered to the customer.

The compartments 18 and 20 for unfolded bags, the former for medium size bags and the latter for large size bags, are provided with false or vertically movable bottoms 25 and 26, which are biased upwardly by means of a shank portion or tongue 28 in each side thereof, which tongue 28 is guided by a channel 29, built of wood, plastic or metal or the like, and which is engaged by the free arm of a lever 30, one for each side of the compartment as clearly illustrated in FIGURES 1 and 4 of the drawings, pivotally mounted on a pivot pin 31 and provided on the other end with a treadle 32 extending between both levers 30 corresponding to each compartment for unfolded or open bags. By this means, once the bags are filled with goods, the cashier or operator of the dispensing unit can simply press with a foot against one of the treadles 32, lifting the false bottom 25 or 26 and with it the bag which is thereon, thereby allowing the customer to take said bag with comfort and without the need of introducing the hands into the compartment or bend the body to effect withdrawal of the bag from the compartment.

Figure 6:
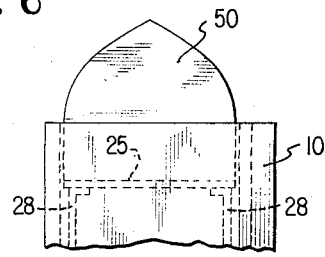
FIGURE 6 is a front elevational view of the compartment shown in FIGURE 5, showing the front vertical flap in its outer position to display the advertisement.

In a further embodiment of the present invention as shown in FIGS. 5 and 6, in order that the bags will not fall or tend to fall when lifted towards the customer's side, a vertical flap 50 is provided in each false bottom forming an angle of 90° therewith so as to serve the function of supporting one side of the filled bag and avoid an accidental fall thereof. These flaps 50 can be used as places for printing advertisements or the like, inasmuch as the flaps are clearly visible to the customers when the false bottoms are lifted to deliver the bags with goods.

The device of the present invention also has a table 23 with a fillet 33 all around (except the side facing the false bottom compartments) to avoid the accidental fall of goods such as cans and the like, which table 23 has an undercut portion 34 to receive a complementary surface 35 provided by a flange integrally formed with the chute 36 which is clearly illustrated in FIGURE 3 of the drawings.

The chute 36 is guided by grooves 37 provided on the inner surfaces of walls 10 and 13′. The chute is comprised by a bottom surface or incline proper 38, and two side walls or flanges 39. In the outer end, chute 36 is provided with said flange 35 forming an angle with the remainder of the chute of less than 90° and such than, when the chute is retracted, flange 35 forms a continuation of the surface of table 23 and fits with precision into the undercut portion 34 thereof. Said undercut portion has a shoulder 42 for the engagement of complementary shoulder 43 provided at the end of flange 35 (as clearly shown in FIGURE 3 of the drawings). This shoulder 42 also serves the function of supporting the shoulder 43′ provided at the inner end of the chute (as clearly shown by dotted lines in FIGURE 3 of the drawings) when the latter is withdrawn.

Chute 36 also comprises a hinged support 40, hinged by the hinge 41 to the outer end of the chute, which support 40, when the chute is in its retracted position, is received into a complementary cut portion 45 of grooves 37. Support 40, when the chute is in its projected position (shown in dotted lines in FIGURE 3 of the drawings), hinges away from the incline 38 and stands upright on a pair of grooves 44 provided in walls 10 and 11, whereby the chute is fixed in a steep position to convey by gravity slippage all goods placed in the upper surface of the incline.

Figure 8:
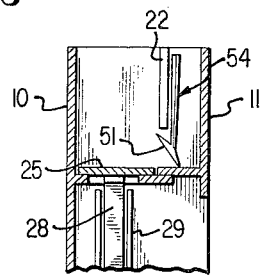
FIGURE 8 is a side elevational view in cross section, showing the bag compartment with the intermediate partitions with the bag in folded position.

The performance of the unit of the present invention when the chute is in its retracted position is as follows:

With compartments 17, 19 and 21 (and 17′, 17″) full of folded bags, which group of bags fill the compartment up to the partitions 22 having a taper 24 as shown in FIGS. 1–3 and 8–10, in order to introduce a bag within the compartments for unfolded bags 16, 18 and 20 (and also 16′ and 16″), the only operation required of the operator or cashier is to introduce a hand and arm into the bag next to the partitions 22 as shown in FIG. 8 in which only one bag 54 is illustrated although in actual operation the compartment is completely filled with folded bags 54 arranged with their bottoms 51 toward the partitions, whereby said bag is automatically unfolded by the swinging of the bottom 51 downwardly and forwardly beneath the bottoms of the partitions 22 with the upper bag portion passing through the tapers 24 of partitions 22.

Figure 9:
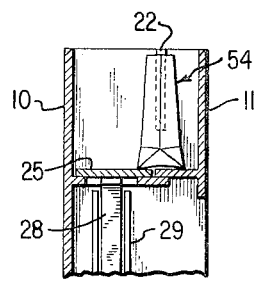
FIGURE 9 is a view similar to FIGURE 8, but showing the bag partially open.
Figure 10:
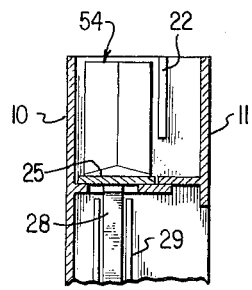
FIGURE 10 is a view similar to FIGURES 8 and 9, but showing the bag completely open in the compartment for open bags.

As shown in FIGS. 8–10, bag 54 is first partially unfolded when it is next to the partition 22, because the bottom 51 of the bag will unfold by itself, inasmuch as it does not encounter any obstruction from the partitions 22, in view of the gap provided between the lower end of said partitions and the bottom of the compartment. When the hand and arm of the operator are introduced inside the bag 54, the folded bottom 51 is partially unfolded about the fold line 52, FIG. 7.

When pressure of the hand of the operator is applied on the front face of the bag, the fold line 53 permits the unfolding of the bag to place it in a position, FIG. 9, with one face of the bag beyond the partitions 22, and the other face still retained by said partitions. When the pressure of the hand of the operator is increased, the bag will pass completely to the compartment for unfolded bags, FIG. 10, and the bag 54 will be completely open in view of the partial obstruction offered by partitions 22 when the pressure of the hand of the operator is applied on the front face only of the bag, as above mentioned.

By means of the above sequence of operations, the bag is automatically placed already open into a compartment (16, 18 or 20, or 16′ or 16″) and ready for receiving goods. In the case of compartments 18 and 20 having lifting mechanisms, the bag already filled will be lifted for delivery to the customer, or in the case of compartments 16, 16′ and 16″ the bag will be withdrawn by hand to deliver it to the customer.

Therefore, the cashier needs only to wait for the arrival of a customer with a cart filled with goods, for withdrawing the goods from the cart and, after marking the price thereof in the cash registering machine, introducing them directly to the open bag, thus avoiding a complicated series of movements which were heretofore considered absolutely necessary.

If the chute 36 is in its projected or working position, then the cashier is generally helped by a second person and all the goods are, after registering the prices thereof in the cash registering machine, placed on the upper part of the incline, so that they will slip down to the table 23 in order to make them available to said second person who will pack them into bags located in compartments 16′, 16″, and obtained from compartments 17′ and 17″. This second person will deliver the bags filled with goods to the customer.

One of the most important features of the present invention resides in the novel and ingenious construction of the folded and unfolded bags compartments, whereby the operator is enabled to unfold the bag by a single movement of the hand. Another feature of the present invention resides in the fastness with which the bags can be withdrawn from the compartments by the action of the treadles, and another feature of importance is the provision of the incline or chute in order to provide a nonobstructed conveyance of the goods to a second person who will pack them into the bags.

Therefore, a novel type of dispensing device or unit has been provided by the present invention, which is extremely fast in its operation and which avoids the use of complicated mechanical devices such as motors, conveyor belts and the like, so its maintenance is made very cheap and simple.

Inasmuch as changes and modifications are possible in all the parts and combination of parts of the device of the present invention, the above description must be considered as non-limitative of the broad features of the device, a preferred embodiment of which has been described. The only limitations which are to be applied to the invention are as stated in the following claims, and all equivalent parts to those described can be substituted without affecting the spirit and scope of the present invention.

Having thus described my invention, what I claim as new and desire to secure by Letters Patent is:

1. A check-out counter for the handling of articles in a market comprising a cabinet having at least one bagging well, said well having an open top and being composed of a horizontal bottom wall, a vertical front wall and a vertical rear wall spaced from and confronting the front wall, with the front wall being faced by the customer and the rear wall faced by the operator of the check-out counter, said well further including spaced apart parallel vertical side walls connecting the front and rear walls, a vertically disposed rib provided on each side wall, said ribs being disposed in alignment crosswise of the well, said ribs dividing the well into a first bag storage compartment between the ribs and the rear wall for retaining bags in folded storage condition with the bottoms of the bags folded up against one of the folded sides of the bags and with the folded bottoms of the bags disposed below the lower ends of the ribs, said ribs dividing the well into a second filling compartment in cooperation with the front wall, said second compartment being of a cross-sectional extent to house a fully open bag for the reception of articles placed therein by the operator from the cart of the customer after the price of each article has been tallied by the operator, said ribs being relatively narrow in their protrusion from the side walls and having free edges to overlap the side edges of folded bags in the first compartment but being spaced to permit passage of the upper portions of a bag through the space therebetween by manual force and the lower ends of said ribs being spaced above the bottom wall a distance sufficient to preclude overlapping the folded bag bottoms whereby the operator can introduce one arm into the bag in contact with the ribs and move the bag through the space between the ribs toward the second compartment thereby causing the bottom of the bag to swing freely under the ribs while the side edges of the upper portion of the bag are acted on by their contact with the ribs to exert an opening effect on the sides of the upper portion of the bag whereby the bag is positioned in the second compartment in a fully open position for the reception of articles.

2. A check-out counter according to claim 1, wherein said bottom wall for the first compartment is fixed, the bottom wall for the second compartment being vertically movable and manually operable means for moving said movable bottom wall.

3. A check-out counter according to claim 2, wherein said last means comprises foot actuated treadle means operatively connected with said movable bottom for lifting said bottom with a filled bag thereon to facilitate removal of the filled bag from the second compartment.

4. A check-out counter according to claim 2 comprising a vertical flap fixed to said movable bottom along the edge thereof opposite the bag storage compartment to prevent a filled bag falling from said bottom as the bottom is elevated.

5. A check-out counter according to claim 1 wherein said counter is L-shaped in configuration and includes a covered counter section at the apex and at least one of said bagging wells in each branch thereof and a chute slidably mounted within said covered counter section for movement between an inoperative position within said section and an operative position forming a ramp overlying one branch of said counter, whereby a check-out operator can deposite check-out goods on said ramp to be slid down onto the covered section for bagging by an assistant using the bagging well in the other branch.

References Cited by the Examiner
UNITED STATES PATENTS

| | | | |
|---|---|---|---|
| 2,106,463 | 1/1938 | Long | 53—384 |
| 2,641,400 | 6/1952 | Simmons | 53—390 |
| 2,909,020 | 10/1959 | Mersky | 53—390 |
| 3,025,651 | 3/1962 | Stanley | 53—384 |

TRAVIS S. McGEHEE, *Primary Examiner.*
ROBERT A. LEIGHEY, FRANK E. BAILEY,
*Examiners.*